METHODS AND APPARATUS FOR PREVENTING WATER HAMMER IN TAILRACE OR SUCTION LINES

Filed Sept. 30, 1963

INVENTORS
Susumu Naganuma
Mizuho Tanaka

BY Paul M. Craig, Jr.
ATTORNEY

United States Patent Office 3,264,485
Patented August 2, 1966

3,264,485

METHODS AND APPARATUS FOR PREVENTING WATER HAMMER IN TAILRACE OR SUCTION LINES

Susumu Naganuma and Mizuho Tanaka, Hitachi-shi, Japan, assignors to Hitachi, Ltd., Chiyoda-ku, Tokyo, Japan, a corporation of Japan Filed Sept. 30, 1963, Ser. No. 312,482
Claims priority, application Japan, Oct. 2, 1962, 37/42,702
7 Claims. (Cl. 290—40)

The present invention relates to methods and apparatus for preventing water hammer in the tailrace or suction lines of water turbines, pump turbines or pumps, and is characterized by the forced supply of compressed air into the tailrace or discharge line in simultaneous relation with the commencement or occurrence of conditional change in turbine operation such as load cutoff input, cutoff to a pump, pump tripping or any sudden marked change in load in said machinery.

As commonly known in the art, water hammer is liable to develop in a long tailrace or suction line. Especially when the amount of flow in the line undergoes a great change as in case of the above-mentioned difficulties, a marked pulsating change in the hydraulic velocity takes place, and this will cause water hammering in the water line, thus endangering the operation of the water turbine or like machinery connected thereto.

Therefore, the primary object of the invention is to provide a method and apparatus for preventing unusual water hammer which may be developed on the occasion of commencement or change in operating conditions such as described above, in order to insure the safety of operation of said water turbines or like machinery.

The inventors have made a strenuous effort to investigate the cause for such unusual operating condition, and as a result thereof, found out that such condition is due to rapid reduction in pressure developed in the tailrace or suction line in the event of sudden change in operating conditions.

In order to deal with such difficulty, a novel arrangement is made in the invention according to which air is forced into the tailrace or suction line in the event of such difficulty so as to suppress the possibility of occurrence of surging induced by the negative pressure and, at the same time, to prevent any unusual rise in hydraulic pressure which may be caused by the reaction thereagainst.

Heretofore, means for force-feeding air have been adopted in water turbines for the purpose of minimizing whirling flow of water in the tailrace thereof to reduce surging or cavitation during operation at a partial load. Such conventional method, however, is fundamentally different from the method of the invention in which air for preventing the generation of negative pressure is solely introduced when great change takes place in the flow during such case as load cutoff.

According to the invention, there is provided a method for preventing water hammer in the tailrace or suction line of a water turbine, pump turbine or pump provided with said tailrace or suction line and a runner, and any other elements, comprising means for forcing compressed air into said tailrace or suction line in simultaneous relation with the commencement or occurrence of any change of operating condition.

According to the invention, there is also provided an apparatus for preventing water hammer in a tailrace or suction line of a water turbine, pump turbine or pump provided with said tailrace or suction line and a runner, and any other elements, comprising an air reservoir filled with compressed air, a conduit for conducting said compressed air from said air reservoir to said tailrace or suction line, and an air valve provided partway in said conduit and set to open in simultaneous relation with the commencement or occurrence of conditional change in turbine operation.

There are other objects and particularities of the invention which will be obvious from the following description with reference to the accompanying drawings, in which.

Figure 3:
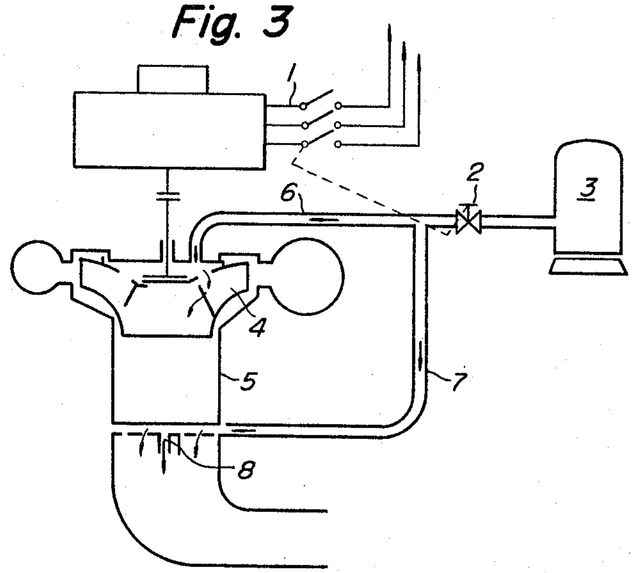
FIG. 3 is a diagrammatic arrangement of a preferred embodiment of an apparatus according to the invention.

Now referring to FIG. 3, there is shown a water turbine to which the method and apparatus of the invention is applied. As is described in U.S. Patent 3,118,281 to Gros, the water turbine is conventionally coupled to an alternating current generator which is in turn connected to a load through a circuit breaker 1. In these conventional turbine systems in the event of loss of load, i.e., when the alternator becomes disconnected from the electric mains by opening of the circuit breaker, the governor means, normally provided to monitor and control turbine speed reduces considerably the opening of the wicket gates controlling the amount of water flow to the turbine so that the water flow rate is considerably reduced. However, as clearly indicated in FIGURE 1, a sudden closing of the wicket gate of the turbine produces an undesirable pulsating of the hydraulic pressure in the tailrace resulting in water hammer. The invention serves to eliminate this problem of conventional turbine systems. The apparatus of the invention comprises an air reservoir 3 filled with compressed air which is supplied into a runner 4 of the water turbine, thence into a tailrace 5, by way of an air valve 2 and a conduit 6. According to the invention, the air valve 2 is interlocked with the circuit breaker 1 for conjoint operation therewith, that is, set to open in response to the actuation of the circuit breaker 1. An air conduit 7 is branched off from the conduit 6 downstream of the air valve 2 for force-feeding compressed air into the tailrace 5 through a conduit 8.

If the circuit breaker 1 is actuated to open the circuit due to some accidental failure in the load, the air valve 2 is made to open in response to the action of the breaker 1 so as to coincide with the closing of the wicket gate. Compressed air, therefore, is fed from the reservoir 3 into the tailrace 5 by way of the conduit 6 and the portion of the runner 4. Portion of compressed air is also forced into the tailrace 5 through the branched conduit 7 and conduit 8. The forced supply of compressed air into the tailrace is quite effective to eliminate any temporarily prevailing negative pressure downstream of the runner 4 and thus to minimize the water hammer. It will be readily understood that, in the case of pumps, numeral 5 designates a suction line instead of the tailrace and the circuit breaker 1 would connect the pump to energizing voltage.

Figure 1:
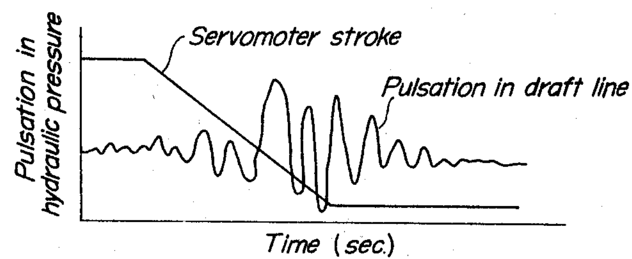
FIG. 1 is a graphic illustration showing relation between hydraulic pressure in a tailrace and the turbine wicket gate opening plotted against time in accordance with the prior art.
Figure 2:
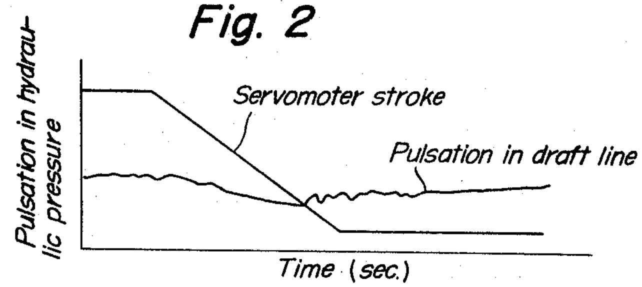
FIG. 2 is a graphic illustration showing relation between hydraulic pressure in a tailrace and the turbine wicket gate opening plotted against time when the method of the invention is practised.

In FIGURES 1 and 2, the hydraulic pressure in the tailrace and the wicket gate opening, which controls the amount of water entering the turbine, is plotted against time. The relatively straight line curve designated "servo motor stroke" indicates a gradual closing of the wicket gate through actuation of the servo motor associated therewith.

FIGURE 1 shows that in conventional turbine arrangements, shortly after initiation of closing of the wicket gate a pulsation in the hydraulic pressure in the tailrace begins and builds up to a rather large value just prior to and at complete wicket gate closing. This pulsating pressure is the water hammer in the turbine. However, with the method of the invention, the response to wicket gate closing is different, as indicated in FIGURE 2. No appreciable pulsation in hydraulic pressure occurs due the simultaneous application of compressed air to the tailrace. Water hammer is thus eliminated.

It should be understood from the above description that the teaching of the invention may be practiced in different ways within the skill of the ordinary worker, for example, in turbines the closing of the wicket gates can be detected in other ways than that specifically set forth above and the air valve actuation can be effected by other devices than the circuit breaker.

What is claimed is:

1. An apparatus for preventing water hammer in connection with hydraulic devices having runner means, inlet line means or outlet line means, a negative pressure occurring in one of said line means upon commencement of sudden changes from the steady state operating conditions of said hydraulic device, a negative pressure occurring in one of said line means upon commencement of sudden changes from the steady state operating condition of said hydraulic device, comprising supply means for supplying compressed air, connecting means operatively connecting said supply means with said said line means for supplying compressed air to said line means including valve means having valve-actuating means, and means responsive only to said sudden changes and operatively connected with said valve-actuating means for opening said valve means to supply compressed air to said line means upon occurrence of such sudden changes.

2. The combination according to claim 1, further comprising a generator connected with said hydraulic device, and wherein said hydraulic device is a turbine, or pump turbine used as a turbine, said line means is a tailrace and said last-mentioned means is a circuit breaker connected in the output of said generator and effective to open said valve means upon opening thereof.

3. The combination according to claim 1, further comprising a motor connected with said hydraulic device, and wherein said hydraulic device is a pump, said line means is a suction line and said last mentioned means is a circuit breaker connecting said motor with an operative source of electrical power.

4. An apparatus for preventing water hammer in hydraulic devices having runner means and outlet line means wherein a negative pressure occurs upon commencement of sudden closure of the water supply to said hydraulic device comprising supply means for supplying compressed air, connecting means including valve means having valve-actuating means for opening said valve means and operatively connecting said supply means with said outlet line means, and means responsive to said condition of sudden changes resulting in elimination of water supply to said hydraulic device and operatively connected with said valve-actuating means for supplying compressed air to said line means upon occurrence of said condition.

5. The combination according to claim 4, further comprising a generator connected with said hydraulic device, and wherein said hydraulic device is a turbine, said outlet line means is a tailrace of the turbine and said last mentioned means is a circuit breaker connected in the output of said generator and effective to open said valve means upon opening thereof.

6. An apparatus for preventing water hammer in hydraulic devices having runner means and inlet line means wherein a negative pressure occurs upon commencement of the condition of sudden elimination of driving power of said hydraulic device comprising supply means for supplying compressed air, connecting means including valve means having valve-actuating means for opening said valve means and operatively connecting said supply means with said inlet line means, and means responsive to said sudden elimination of the driving power to said hydraulic device operatively connected with said valve-actuating means for supplying compressed air to said line means upon occurrence of such condition.

7. The combination according to claim 5, further comprising a motor connected with said hydraulic device, and wherein said hydraulic device is a pump, said line means is a suction line and said last mentioned means is a circuit breaker connecting said motor with an operative source of electrical power.

References Cited by the Examiner

UNITED STATES PATENTS

| | | | |
|---|---|---|---|
| 2,262,191 | 11/1941 | Moody | 230—127 |
| 2,803,428 | 8/1957 | Garnett | 253—26 |

FOREIGN PATENTS

| | | |
|---|---|---|
| 1,498 | of 1915 | Great Britain. |
| 277,433 | 9/1927 | Great Britain. |
| 766,089 | 4/1934 | France. |
| 1,075,070 | 4/1954 | France. |

ORIS L. RADER, *Primary Examiner.*

JOSEPH H. BRANSON, Jr., *Examiner.*

H. F. RADUAZO, G. SIMMONS, *Assistant Examiners.*